United States Patent [19]

Pearson

[11] Patent Number: 4,835,124
[45] Date of Patent: May 30, 1989

[54] ALUMINA CERAMIC PRODUCT FROM COLLOIDAL ALUMINA

[75] Inventor: Alan Pearson, Murrysville, Pa.

[73] Assignee: Aluminum Company of America, Pittsburgh, Pa.

[21] Appl. No.: 946,839

[22] Filed: Dec. 29, 1986

Related U.S. Application Data

[63] Continuation-in-part of Ser. No. 781,208, Sep. 30, 1985, which is a continuation of Ser. No. 534,665, Sep. 22, 1983, abandoned.

[51] Int. Cl.$^4$ .......................... C05B 35/10; C03C 3/00
[52] U.S. Cl. ........................................ 501/127; 501/12
[58] Field of Search ................ 252/455 R, 463, 315.7; 423/626, 628; 501/12, 127, 153

[56] References Cited

U.S. PATENT DOCUMENTS 4,224,302  4/1980  Okamoto et al. .................. 423/628

OTHER PUBLICATIONS

CA 104(26)229175z, "Seeding with . . . Alumina", McArdle et al., 1986.
CA 103(20)165018v, "Controlled . . . Seeding", Kumagai et al., 1985.
CA 102(6)49927w, "Enhanced . . . Seeding", Kumagai et al., 1984.

*Primary Examiner*—Ferris H. Lander
*Attorney, Agent, or Firm*—Andrew Alexander

[57] ABSTRACT

Disclosed in a process for forming a ceramic body from colloidal boehmite and alpha alumina. Alpha alumina is added to the colloidal boehmite to produce a seeded gal, the seeded gel capable of being sintered at a low temperature to produce a ceramic product having at least a 90% theoretical density.

6 Claims, 5 Drawing Sheets

SEEDED SOL-GEL EXPERIMENTAL PROCEDURE

SEEDED SOL-GEL EXPERIMENTAL PROCEDURE

1 Hr. at 1350° C

No seed

1% Seed

10% Seed

Type B Gel With Classified XA-139 Seed

1 Hr. at 1350°C

No seed

1% Seed

10% Seed

Ion Exchange Type B Gel
With Classified XA-139 Seed

ALUMINA CERAMIC PRODUCT FROM COLLOIDAL ALUMINA

CROSS-REFERENCE TO RELATED APPLICATIONS

This application is a continuation-in-part of U.S. Ser. No. 781,208, filed Sept. 30, 1985, which is a continuation of U.S. Ser. No. 534,665, filed Sept. 22, 1983 (abandoned).

FIELD OF THE INVENTION

The present invention relates to a ceramic body and more particularly, the present invention relates to a method of forming an alumina containing ceramic body of high density and fine grain structure.

INTRODUCTION

Sol-gel processing of alumina ceramics has received much interest in the last several years as a potential method of producing sintered alumina with properties superior to those of traditional alumina ceramics. The hope has been that uniform distribution of controlled additives along with very small, uniform porosity (which is characteristic of sol-gel material) would permit densification at ultra-low temperatures and result in alumina ceramics with greatly improved properties.

One major problem has been that the alumina sols are prepared from microcrystalline boehmite, and that in transforming from boehmite to gamma to alpha alumina, a porous structure with very poor sintering characteristics results. One approach to solving this problem is disclosed in U.S. Pat. No. 4,314,827. The patent discloses using a second component (5-6% MgO) which apparently modifies the calcination and sintering characteristics and allows a very fine grained, tough microstructure to be achieved.

In the prior art, other attempts have been made to develop high density alumina ceramic parts. For example, an article entitled "Enhanced Densification of Boehmite Sol-Gels by Alpha-Alumina Seeding" by Kumagai and Messing, dated November 1984 discloses seeding boehmite sol-gels with alpha alumina and subsequently sintering to obtain high densities at 1200° C. whereas unseeded gel had to be sintered at 1600° C. In this work, the boehmite powder was formed by hydrolysis of aluminum alkoxide.

European patent application No. 152,768 discloses that the hardness and microstructure of aluminous abrasives produced from alumina gels are enhanced by the introduction of very fine alpha alumina seed particles in the amount of 1% or less.

The prior art processes require rather expensive processing to obtain the sol-gel precursor for the sintered grain. Therefore, there is a great need for an inexpensive process which can result in a high quality sintered product. The subject invention provides such a process which will permit the use of sintered alumina based on sol-gel processing to have wide application.

SUMMARY OF THE INVENTION

It is an object of the present invention to provide a method for preparing a high quality sintered alumina from an inexpensive precursor.

In accordance with these objects, there is provided a process for forming a ceramic body from colloidal boehmite and alpha alumina comprising the steps of forming the colloidal boehmite by bringing the aluminum hydroxide selected from the group consisting of gibbsite, bayerite and nordstrandite together in a liquid aqueous medium with a seed effective for providing a base for boehmite growth, and reacting under hydrothermal conditions for producing colloidal boehmite by depositing boehmite on the seed at the expense of the aluminum hydroxide. In addition, alpha alumina is added to the colloidal boehmite to produce a seeded gel, the seeded gel capable of being sintered at a low temperature to produce a ceramic product having at least a 90% theoretical density and fired grain size below 1.0 micrometer diameter.

DESCRIPTION OF THE PREFERRED EMBODIMENTS

Figure 1:
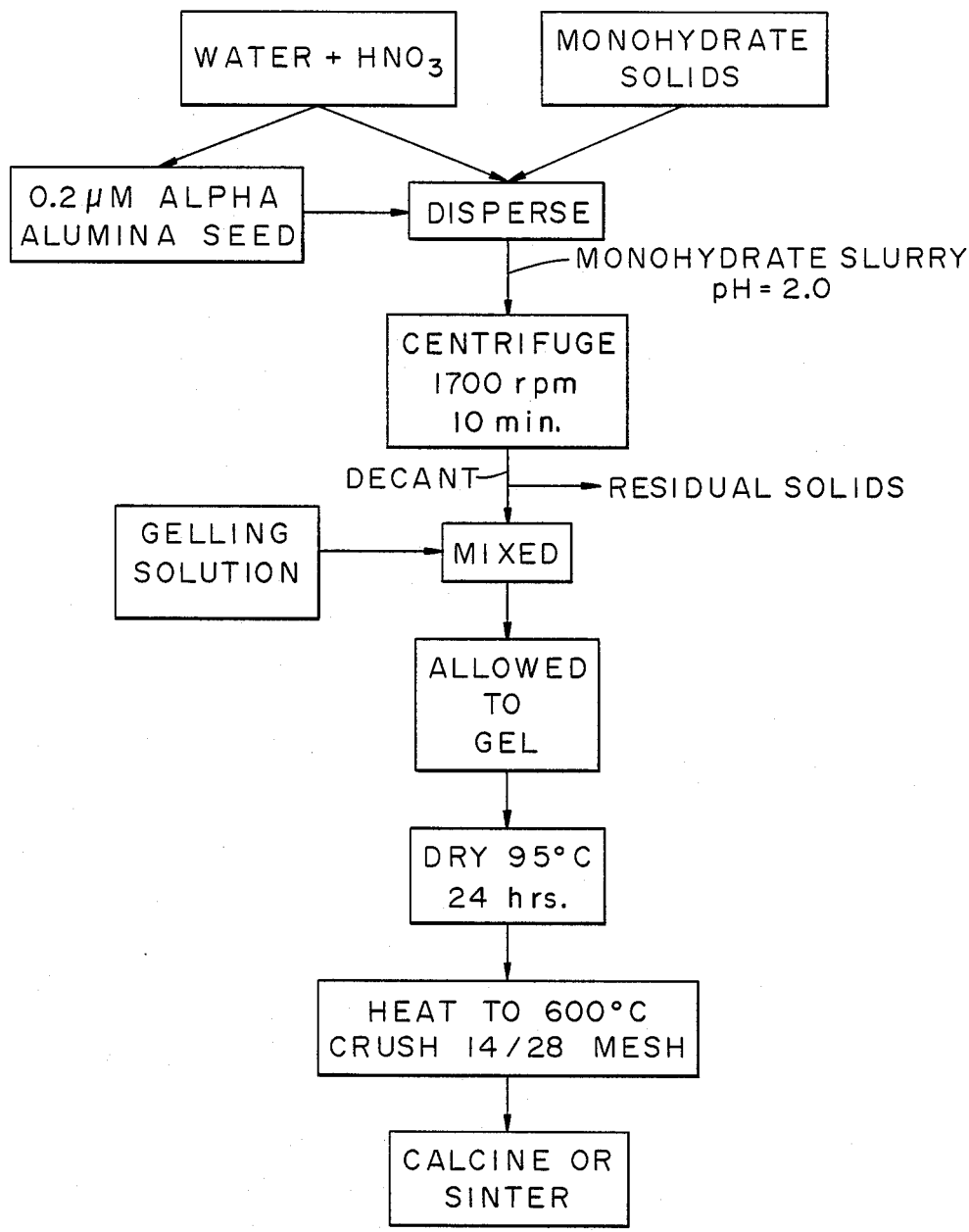
FIG. 1 is a flow diagram of the process for preparing ceramic bodies in accordance with the invention.

Referring now to FIG. 1, there is shown a block diagram of a process for preparing ceramic bodies in accordance with the invention. The monohydrate solids or boehmite used in the invention can be in dry powder or slurry form. In accordance with the process, the powder is mixed with water and the pH adjusted to 2 to 4 with $HNO_3$ before being mixed or dispersed for about 2 minutes in a blender.

For purposes of seeding, alpha alumina particles may be added after mixing or dispersing to provide a boehmite slurry. The seeding material, which preferably is added as a slurry, can be prepared by dispersing alpha alumina (e.g., Alcoa XA-139 SG alumina) in water, e.g. 50 gms of powder to 150 gms of water and the pH adjusted 3.0 with $HNO_3$. Preferably, the alpha alumina has a median particle size in the range of 0.05 to 1.0 micrometer with typical median particle size being about 0.2 micrometers. Smaller particle sizes are preferred since more seed particles are available, as shown by the relationship n approximately equal to $K/D^3$ where n is the number of particles, K is a proportionality constant and D is the particle diameter. To obtain the smaller sizes, standard classification methods, such as sedimentation or centrifugation, can be used if desired. The effect of seed particle size in seeding of alkoxide-derived alumina is discussed in the Kumagai and Messing article.

In the procedure, the slurries (seeded sols) are normally centrifuged and then gelled by evaporation or the addition of gelling agents. Any suitable gelling agent may be used, e.g., a 15% $Mg(NO_3)_2$ solution to provide a 0.5% MgO ($Al_2O_3$ basis) or a 21% $Al(NO_3)_3$ solution to provide 1% $Al_2O_3$. The slurry may be mixed to permit the gelling agents to become more uniformly distributed before or after being allowed to gel.

The gels may be oven dried, e.g. overnight at 90° C., and then heated for a sufficient time to remove nitrates. Typically, the nitrates can be removed by treating for one hour at 600° C. After nitrate removal, the material is calcined or sintered to produce a highly dense, alumina ceramic product having a fine grained uniform microstructure.

Colloidal alumina required for this invention is produced by hydrothermal digestion of a mixture of aluminum hydroxide and a high surface area alumina gel or microcrystalline boehmite seed. Aluminum hydroxide is also called "alumina trihydrate" and "gibbsite". Aluminum hydroxide can also have crystal structures other than that of gibbsite. Examples are bayerite or nordstandite.

According to this aspect of the invention, a highly dispersible, inexpensive colloidal boehmite can be produced by the following process: (a) prepare a high, e.g. greater than about 100 $m^2/g$, where $m^2/g$ stands for square meters per gram, surface area, well dispersed, e.g. median particle size less than about 500 Angstroms, alumina seed consisting essentially of amorphous or microcrystalline boehmite phases; (b) mix this seed material plus water with a less expensive alumina product such as gibbsite to form an aqueous slurry; (c) convert the mixture to colloidal boehmite by heating at high temperature under autogenous stream pressure.

Using this process, one can prepare dispersible alumina with the high surface area component amounting to as little as 5% or less of the total alumina equivalent in the feed and the less expensive gibbsite amounting to 95%. Apparently, during high temperature reaction, the high surface area component is quickly converted to colloidal boehmite while the gibbsite component slowly converts to boehmite through a dissolution-seeding mechanism.

Advantages of the invention include that a substantial amount of the alumina is furnished by a low cost material and no washing or filtration of the product is required after conversion to boehmite. Lack of need for filtration is especially important because colloidal boehmite is quite difficult to filter and wash. In the alkoxide-based approach of e.g. U.S. Pat. No. 3,357,791, little or no washing is required but the starting material is quite expensive.

The main impurity in the product is sodium oxide at a level of 0.15 to 0.3%. This is present in the low-cost gibbsite feedstock and carries through to the product. If a lower sodium content is required in certain cases, the sodium can be further reduced by using gibbsite with a lower soda content or removing the sodium after the boehmite is formed by ion exchange, dialysis or other means.

Examples of processes that can be used to provide high surface area seed are hydrolysis of aluminum alkoxides and the many well-known alumina gel reactions. Regardless of which approach is taken, the seed must have high surface area and be capable of attaining a colloidally-dispersed condition.

The low cost aluminum hydroxide component can be gibbsite or bayerite. It is desirable to use a fine particle size aluminum hydroxide (nominally 5 micron crystal size or less) since coarser particles will require more severe digestion conditions (higher temperature, longer time) to completely react and lead to a somewhat lower surface area product. The fine particle size can be attained either by precipitation or grinding.

If dispersing agents are used to peptize the system, they should be effective but not interfere with the end use. For example, chlorides and sulfates are generally undesirable in catalytic applications. Nitric acid is preferred since it is a very effective peptizing agent in the pH range of about 5 or less and is generally not objectionable in the product.

The hydrothermal reaction of the invention is carried out in a closed pressure vessel preferably without supplemental pressure regulation by nitrogen introduction or the like, i.e. reading the pressure essentially permits knowledge of temperature by way of the pressure-temperature relationship for steam in equilibrium with water. Preferred batch reaction conditions are about 180° to 220° C. for about one hour. Percent solids (seed plus hydroxide) can be from e.g. 2 to 40%, preferably $4\frac{1}{2}$ to 25%.

Unless indicated otherwise, percentages herein are weight-percents.

To further illustrate the invention, two types of hydrothermally produced dispersible alumina, denoted A and B, were used in accordance with the invention. Properties of these materials are shown in Table I. The Type A material had a surface area of about 100 $m^2/g$ and Type B material had a surface area of about 120 $m^2/g$. Data in Table I show analyses of these materials both before and after ion exchange.

Solids concentrations of the mixes were prepared with Type A being 25% and Type B being 23%. These slurries were centrifuged at 1700 rpm for 10 minutes then gelled by adding the solutions indicated above. The gels (consistency of thin paste) were then mixed in a Hobart paddle mixer for 10 minutes to allow some extra time for the gelling agents to become uniformly distributed.

Type B material was used as a 20% solids slurry. In an attempt to lower the sodium content of this material, 1000 g of slurry was stirred with 200 cc of Dowex HCR-W2-H strong acid ion exchange resin for 4 hours at room temperature. During this time, the pH of the slurry fell from about 3.6 to 2.5 indicating that sodium was being removed. At the end of this time, the resin was screened out, the slurry pH was adjusted to 2.0 and then mixed, centrifuged and gelled as indicated above. Type B was used with and without the ion exchange treatment to determine the effect of sodium on this process.

The seed used was a fine particle size fraction of Alcoa XA-139 alumina. 50 grams of the seed alumina was mixed in 150 grams of water and the pH was adjusted to 3.0 with $HNO_3$ and then centrifuged for 10 minutes to provide a stable colloidal seed suspension. The suspended solids had a median size of about 0.2 microns. Suspended solids content of the centrifuged seed slurry was 7.0 wt.%. The gelling agent for Type A material was MgO and 0.5 wt.% was used ($Al_2O_3$ basis) being added as a 15% $Mg(NO_3)_2$ solution. With Type B material, 1% $Al_2O_3$ was added as a 21% $Al(NO_3)_3$ solution.

The seed slurry described above was usually added to the boehmite slurries before the pH was adjusted to 2.0. The quantity of seed used is expressed as percent of total alumina ($Al_2O_3$ equivalent) in the system.

The gels were oven dried overnight at 90° C. then heated one hour at 600° C. to remove the nitrates. On drying, the gels shrank significantly and broke up into hard fragments.

Chunks of material (after drying at 90° C.) were analyzed using a dilatometer at a heating rate of 2 K./min to determine sintering characteristics. The fired densities of the dilatometer specimens were then determined and densities through the heating range were calculated from the shrinkage data.

Figure 2:
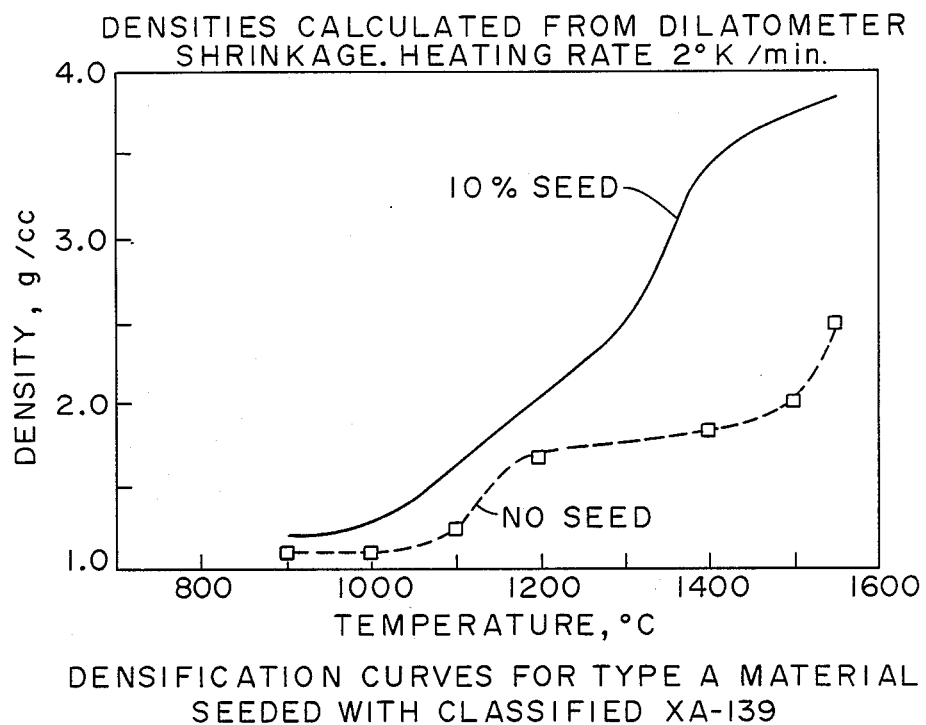
FIG. 2 is a graph showing the sintering characteristics of Type A material.

Type A material was tested at 0 and 10% seeding. FIG. 2 shows the sintering characteristics of the two materials. During the dilatometer test, the seeded sample achieved nearly full densification while the unseeded sample was only beginning to densify. The seeded sample shows the first rapid density change in the 1000°–1100° C. range which is believed to correspond to alpha-alumina formation. The unseeded sample shows this same density increase at about 100° C. higher temperature.

Figure 3:
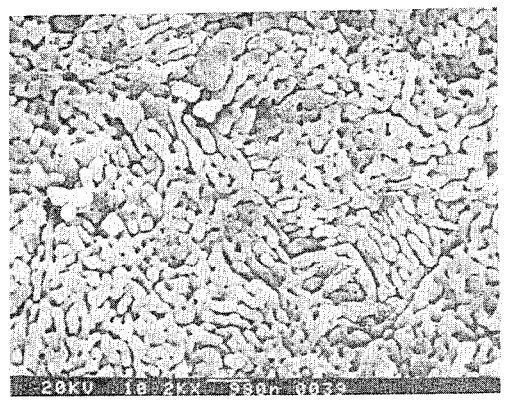
FIG. 3 is a photomicrograph showing SEM's of sintered granules of Type B material.
Figure 3:
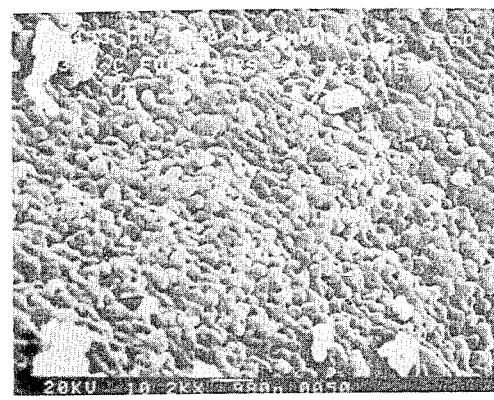
Figure 3:
Figure 4:
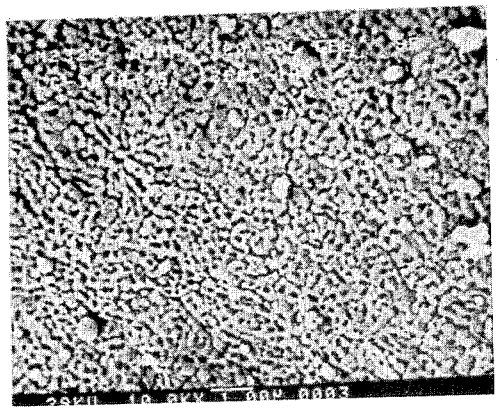
FIG. 4 is a photomicrograph showing SEM's of sintered granules of Type B material.
Figure 4:
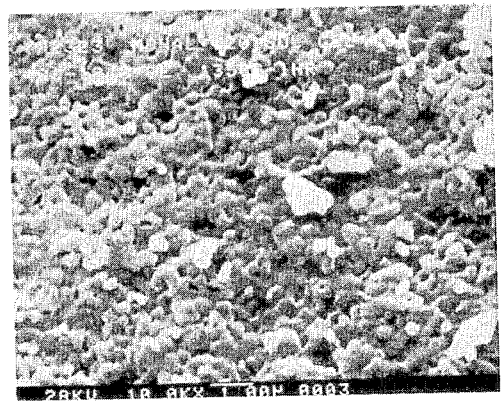
Figure 4:
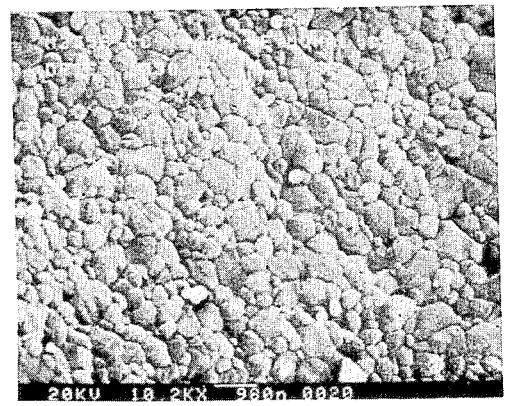

In order to test the effect of soda, Type B material was further studied with about 0.25% $Na_2O$ and virtually $Na_2O$-free. For each soda level, seed was used at levels of 0, 1 and 10%. FIGS. 3 and 4 show SEM's of sintered granules of this material.

Figure 5:
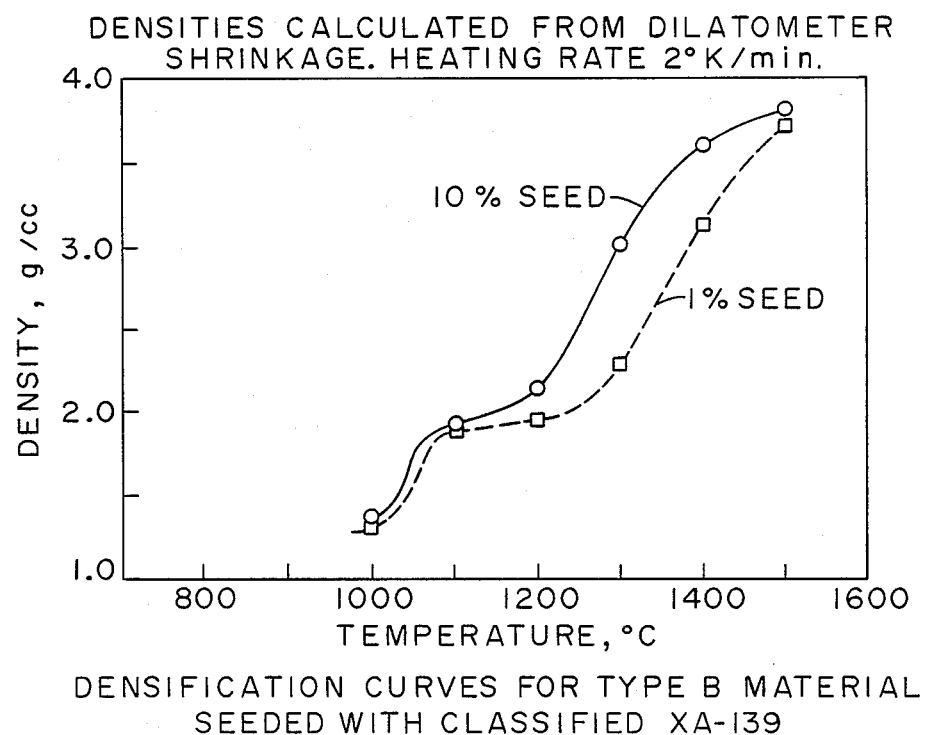
FIG. 5 is a graph showing sintering curves for Type B material with and without $Na_2O$.
Figure 6:
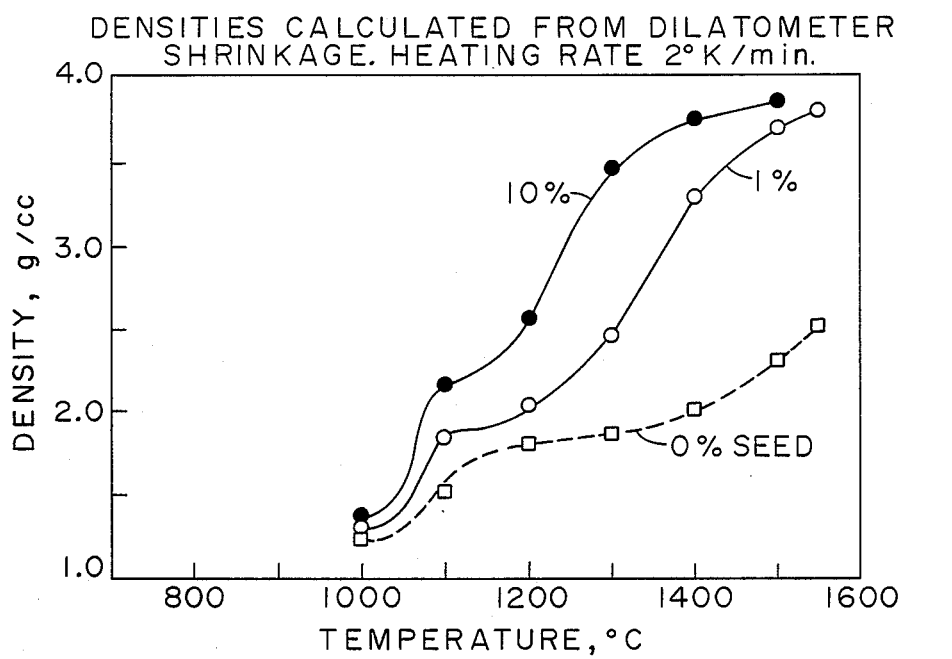
FIG. 6 is a graph showing sintering curves for Type B material with and without $Na_2O$.
Figure 7:
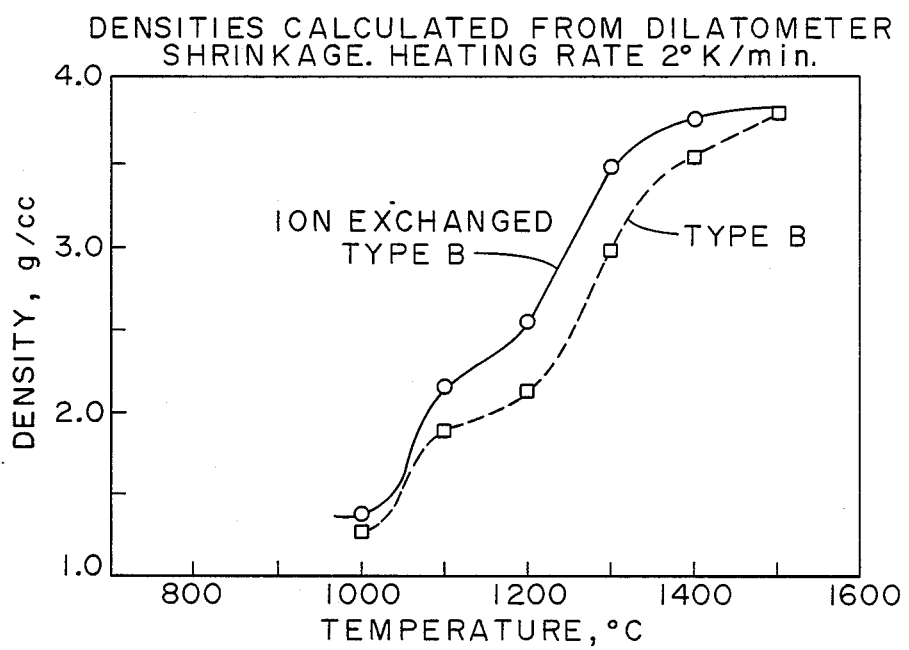
FIG. 7 is a graph comparing sintering data for materials made in accordance with the invention.

These sintered specimens show the trend of less porosity with increasing seed loading. The low-soda 10% seed specimen appears to be fully dense while the corresponding high soda material has some porosity. Both exhibit a very fine-grained microstructure. FIGS. 5 and 6 show sintering curves for Type B material with and without $Na_2O$ (before and after ion exchange) and FIG. 7 compares sintering data for these two materials and Type B with 10% seed added. The low-soda sample densifies at a significantly lower temperature than the high soda version.

TABLE I

ANALYSES OF DISPERSIBLE BOEHMITES
Analyses of Sol-Gel Aluminas

|  | Type A P-2781 | Type B As-is CC-1963-16 | Type B Ion Xch'd CC-1940-1 |
| --- | --- | --- | --- |
| $SiO_2$ | .008 | .018 | .015 |
| $Fe_2O_3$ | .022 | .021 | .020 |
| $TiO_2$ | .036 | .04 | .04 |
| $Na_2O$ | .19 | .23 | .009 |
| CaO | .016 | .017 | .000 |
| MgO | .001 | .001 | .001 |
| ZnO | .003 | .004 | .004 |
| CuO | .000 | .000 | .000 |
| $Ga_2O_3$ | .001 | .010 | .006 |
| $V_2O_3$ | .000 | .000 | .000 |
| NiO | .000 | .000 | .000 |
| MnO | .000 | .000 | .000 |
| $Cr_2O_3$ | .001 | .000 | .000 |
| $B_2O_3$ | .000 | .000 | .000 |
| $ZrO_2$ | .000 | .000 | .000 |
| $LiO_2$ | .000 | .000 | .000 |
| S.A.* ($m^2/g$) | 100–110 | 120–125 | 125 |
| Moist. (%) |  |  |  |
| LOI (%) | 17.61 | 17.2 |  |
| Gibbsite (%) | — |  |  |
| Bayerite (%) | — |  |  |
| Boehmite (%) | 97 |  |  |
| Xtal Size (A) | 105 |  |  |

*Dried at 110° C.

It will be understood that the above description of the present invention is susceptible to various modifications, changes and adaptations and the same are intended to be comprehended within the meaning and range of equivalence of the appended claims.

What is claimed is:

1. A process for forming a ceramic body from colloidal boehmite and alpha alumina comprising the steps of:
   (a) forming the colloidal boehmite by:
      (i) bringing the aluminum hydroxide selected from the group consisting of gibbsite, bayerite and nordstrandite together in a liquid aqueous medium with a seed effective for providing a base for boehmite growth; and
      (ii) hydrothermally digesting for producing colloidal boehmite by depositing boehmite on the seed at the expense of the aluminum hydroxide;
   (b) adding to said colloidal boehmite alpha alumina to produce a seeded gel, the seeded gel capable of being dried and then sintered at a low temperature to produce a ceramic product having at least a 90% theoretical density.

2. The process in accordance with claim 1 wherein the alpha alumina is added as a water slurry.

3. The process in accordance with claim 1 wherein the alpha alumina has a median particle size in the range of 0.05 to 2 micrometers.

4. The process in accordance with claim 2 wherein the slurry has a pH in the range of 2 to 5.

5. The process in accordance with claim 1 including the step of adding a gelling agent to produce said seeded gel.

6. The process in accordance with claim 1 wherein said gel is dried for a sufficient time to remove nitrates therefrom.

* * * * *